United States Patent
Nishida et al.

(10) Patent No.: US 9,015,214 B2
(45) Date of Patent: Apr. 21, 2015

(54) PROCESS OF GENERATING A LIST OF FILES ADDED, CHANGED, OR DELETED OF A FILE SERVER

(71) Applicant: Hitachi Solutions, Ltd., Tokyo (JP)

(72) Inventors: Shimpei Nishida, Tokyo (JP); Yasuhiro Kirihata, Tokyo (JP); Koji Nakayama, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 180 days.

(21) Appl. No.: 13/741,892

(22) Filed: Jan. 15, 2013

(65) Prior Publication Data

US 2013/0198251 A1 Aug. 1, 2013

(30) Foreign Application Priority Data

Jan. 31, 2012 (JP) .................. 2012-017738

(51) Int. Cl.
G06F 17/30 (2006.01)

(52) U.S. Cl.
CPC .... *G06F 17/30091* (2013.01); *G06F 17/30144* (2013.01); *G06F 17/30327* (2013.01); *G06F 17/30336* (2013.01); *G06F 17/30345* (2013.01)

(58) Field of Classification Search
USPC ................. 707/828–830
See application file for complete search history.

(56) References Cited

U.S. PATENT DOCUMENTS

| | | | |
|---|---|---|---|
| 5,845,290 A * | 12/1998 | Yoshii | 1/1 |
| 6,330,606 B1 * | 12/2001 | Logue et al. | 709/226 |
| 7,243,369 B2 * | 7/2007 | Bhat et al. | 726/6 |
| 7,765,277 B1 * | 7/2010 | Meyer et al. | 709/217 |
| 7,854,006 B1 * | 12/2010 | Andruss et al. | 726/24 |
| 2006/0117008 A1 | 6/2006 | Shimogori | |
| 2010/0262638 A1 * | 10/2010 | Fitzgerald | 707/822 |

FOREIGN PATENT DOCUMENTS

JP 2006-268456 A 10/2006

OTHER PUBLICATIONS

Calvin C-Y Chen et al., "Parallel Breadth-first and Breadth-depth traversals of general trees", Advances in Computing and Information ICCI '90, Springer Berlin Heidelberg, Berlin, Heidelberg, vol. 468, May 23, 1990, pp. 395-404.

\* cited by examiner

*Primary Examiner* — Debbie Le
(74) *Attorney, Agent, or Firm* — Mattingly & Malur, P.C.

(57) ABSTRACT

A file scan process is carried out, in parallel in a distributed manner, on a file server for which indices have been created once, to create a list of added, changed, or updated files. A file list of indexed scan target files is created by a distributed processing server. Directory URLs of the scan target files are acquired from the file list and analyzed to count a number of directories in each layer and determine a division unit for division of a scan process to be carried out on the scan target directories, based on a result of the counting.

8 Claims, 13 Drawing Sheets

PROCESS OF GENERATING A LIST OF FILES ADDED, CHANGED, OR DELETED OF A FILE SERVER

BACKGROUND OF THE INVENTION

1. Field of the Invention

The present invention relates to a technique for efficiently analyzing layers of a large amount of file data saved in a file server, and in particular, to a file list generation method and system, a file list generation apparatus, and a program which allow efficient generation of a list of file data for which search indices in a search system are to be updated.

2. Background Art

In recent years, improved speed performance of computers and increased capacities of HDDs have allowed an enormous number of unstructured documents to be produced. This has led to a growing need for a search system which can quickly and adequately find a required document from among an enormous number of documents. To obtain adequate search results, it is important to reflect operations of adding, changing, or deleting file data in search indices a timely manner; the operations are performed, after creation of search indices, on a file server in which an unstructured document to be searched for is stored. When the operations are reflected in the search indices, the search indices only of added, changed, or deleted file data are generally updated because also updating the search indices of unchanged file data requires much time. To achieve this, a list of the added, changed, or deleted file data needs to be created.

To address the need for such a search system, some file servers include an interface which stores a history of operations performed on file data and which provides a list of added, changed, or deleted file data in response to an external request (see JP Patent Publication (Kokai) No. 2006-268456).

When a list of added, changed, or deleted file data is created, if the file server provides such lists, the corresponding interface may be utilized. However, if the file server includes no such interface, all the file data that is present in the file server and for which search indices are to be created needs to be scanned to determine whether or not the data has been updated. In this case, even if only a small amount of file data has been added, changed, or deleted, all the file data needs to be scanned. Thus, disadvantageously, the process for creating a list of added, changed, or deleted file data increases time required for the process of updating indices.

In this regard, the speed of the scan process may be increased by dividing a file tree structure in the file server into a number of portions and carrying out the scan process on these portions in parallel.

However, the file tree in the file server varies depending on the environment of the file server and is unknown. Thus, determining an efficient division method is difficult.

An object of the present invention is to carry out a search index update process at a high speed to make search results from a search system as adequate as possible. To accomplish this object, the present invention aims to provide a file list generation method and system, a file list generation apparatus, and a program which allow a file data scan process to be carried out, in parallel and in a distributed manner, on a file server having created indices once, to create a list of added, changed, or deleted file data at a high speed.

SUMMARY OF THE INVENTION

To achieve the object, a file list generation method according to the present invention includes a step of creating, by a distributed processing server, a file list of indexed scan target files, a step of storing, in a storage device, the file list of indexed scan target files created by the distributed processing server, a step of acquiring the file list of indexed scan target files from the storage device, acquiring directory URLs of the scan target files from the file list, analyzing the directory URLs to count a number of directories in each layer, and determining a division unit for division of a scan process to be carried out on scan target directories, based on a result of the counting, a step of dividing the directories with the scan target files in accordance with a determined division policy, scanning, by the distributed processing server, the scan target files on each of the directories included in the division unit in a distributed manner to create a file list of the scan target files, and a step of comparing the created file list with the file list of indexed scan target files to create a list of files added, changed, or deleted after the scan target files are indexed, and outputting the list.

The step of determining the division unit for the scan process determines a division policy that the number of divisions for the scan process to be carried out on the scan target directories is one when the number of directories counted from a highest layer is less than a predetermined number, and determines a division policy that a first scan is carried out with layers from the directories in the highest layer to a predetermined layer set to be one division unit and that layers located below the scan target directory and discovered during the first scan are scanned with a depth of one layer set to be a division unit when the number of directories is equal to or more than the predetermined number.

Furthermore, a file list generation system according to the present invention includes a distributed processing server which creates a file list of indexed scan target files, a storage device in which the file list of indexed scan target files created by the distributed processing server is stored, file scan process division policy determination means for acquiring the file list of indexed scan target files from the storage device, acquiring directory URLs of the scan target files from the file list, analyzing the directory URLs to count a number of directories in each layer, and determining a division unit for division of a scan process to be carried out on scan target directories, based on a result of the counting, file scan means for dividing the directories with the scan target files in accordance with a determined division policy, scanning, by the distributed processing server, the scan target files on each of the directories included in the division unit in a distributed manner to create a file list of the scan target files, and comparison means for comparing the created file list with the file list of indexed scan target files to create a list of files added, changed, or deleted after the scan target files are indexed, and outputting the list.

The file scan process division policy determination means determines a division policy that the number of divisions for the scan process to be carried out on the scan target directories is one when the number of directories counted from a highest layer is less than a predetermined number, and determines a division policy that a first scan is carried out with layers from the directories in the highest layer to a predetermined layer set to be one division unit and that layers located below the scan target directory and discovered during the first scan are scanned with a depth of one layer set to be a division unit when the number of directories is equal to or more than the predetermined number.

Additionally, a file list generation apparatus according to the present invention includes file scan process division policy determination means for acquiring a file list of indexed scan target files from the storage device, acquiring directory URLs of the scan target files from the file list, analyzing the directory URLs to count a number of directories in each layer, and determining a division unit for division of a scan process to be carried out on scan target directories, based on a result of the counting, file scan means for dividing the directories with the scan target files in accordance with a determined division policy, and scanning, by a distributed processing server, the scan target files on each of the directories included in the division unit in a distributed manner to create a file list of the scan target files, and comparison means for comparing the created file list with the file list of indexed scan target files to create a list of files added, changed, or deleted after the scan target files are indexed, and outputting the list.

The file scan process division policy determination means determines a division policy that the number of divisions for the scan process to be carried out on the scan target directories is one when the number of directories counted from a highest layer is less than a predetermined number, and determines a division policy that a first scan is carried out with layers from the directories in the highest layer to a predetermined layer set to be one division unit and that layers located below the scan target directory and discovered during the first scan are scanned with a depth of one layer set to be a division unit when the number of directories is equal to or more than the predetermined number.

In addition, a file list generation program according to the present invention is used for a system including a distributed processing server which creates a file list of indexed scan target files, a storage device in which the file list of indexed scan target files created by the distributed processing server is stored, and a file list creation server, and allows the file list creation server to function as file scan process division policy determination means for acquiring the file list of indexed scan target files from the storage device, acquiring directory URLs of the scan target files from the file list, analyzing the directory URLs to count a number of directories in each layer, and determining a division unit for division of a scan process to be carried out on scan target directories, based on a result of the counting, file scan means for dividing the directories with the scan target files in accordance with a determined division policy, and scanning, by the distributed processing server, the scan target files on each of the directories included in the division unit in a distributed manner to create a file list of the scan target files, and comparison means for comparing the created file list with the file list of indexed scan target files to create a list of files added, changed, or deleted after the scan target files are indexed, and outputting the list.

The file scan process division policy determination means determines a division policy that the number of divisions for the scan process to be carried out on the scan target directories is one when the number of directories counted from a highest layer is less than a predetermined number, and determines a division policy that a first scan is carried out with layers from the directories in the highest layer to a predetermined layer set to be one division unit and that layers located below the scan target directory and discovered during the first scan are scanned with a depth of one layer set to be a division unit when the number of directories is equal to or more than the predetermined number.

The present invention processes file data for which search indices have been created once, and is configured as follows. The directory structure of the file data is analyzed to count the number of directories. Based on the result of the counting, the division policy for dividing the file data for scanning is determined. In accordance with the determined division policy, the directories with the scan target files are divided. The scan target files on each of the directories included in the division unit are scanned in a distributed manner to create a file list of the scan target files. The created file list is compared with the file list of indexed scan target files to create a list of files added, changed, or deleted after the scan target files are indexed. The list is then output. Thus, a process of updating the search indices can be carried out at a high speed. As a result, the results of searches by the search system can be made as adequate as possible.

DETAILED DESCRIPTION OF THE PREFERRED EMBODIMENTS

A first embodiment for carrying out the present invention will be described below in detail based on the drawings.

Figure 1:
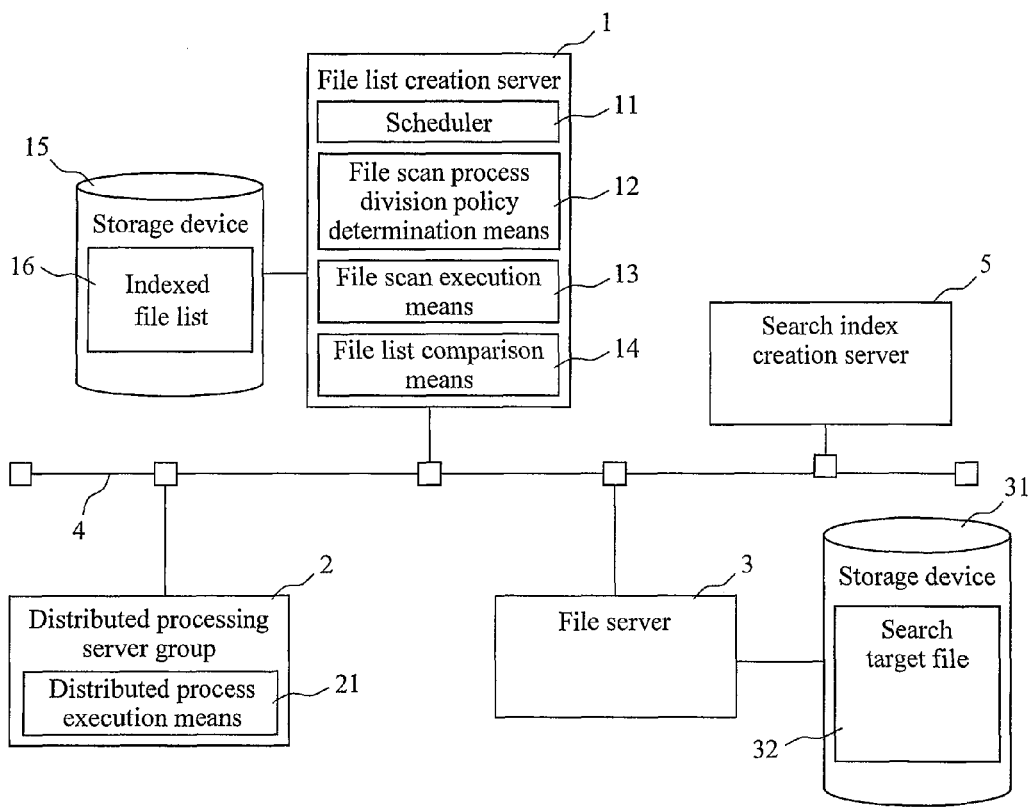
FIG. 1 is a diagram of a system configuration showing a first embodiment according to the present invention.

FIG. 1 is a diagram of a system configuration showing the first embodiment according to the present invention.

A file list generation system shown in FIG. 1 includes a file list creation server 1, a distributed processing server group 2, and a file server 3 (hereinafter referred to as "servers and the like") which are connected together by a wired or wireless communication line such as a LAN (Local Area Network) 4 so as to be able to communicate with one another.

In FIG. 1, the servers and the like are connected together so as to be able to communicate with one another, but the connection method is not limited to the LAN. The servers and the like may be connected together by, for example, a WAN (Wide Area Network) or the Internet. Furthermore, in FIG. 1, the servers and the like are connected together on the same LAN segment. However, this configuration is only illustrative, and the servers and the like may be configured in any manner. Moreover, in FIG. 1, one file list creation server 1, one distributed processing server group 2, and one file server 3 are present. However, at least two file list creation servers 1, at least two distributed processing server groups 2, and at least two file servers 3 may be present. Additionally, the file list creation server 1, the distributed processing server group 2, and the file server 3 need not be different apparatuses. For example, the functions of the file list creation server 1, the distributed processing server group 2, and the file server 3 may be implemented by one apparatus.

This configuration allows the file list creation server 1 to utilize the distributed processing server group 2 to create a list of those of file data on the file server 3 which have been added, updated, or deleted after the last process of creating indices.

The file list creation server 1 is an apparatus such as a PC and is connected to a storage device 15 so as to be able to communicate with the storage device 15.

The storage device 15 is a device such as a magnetic disk and is embedded in or externally connected to the file list creation server 1. The storage device 15, a main storage device for the file list creation server 1, and the like function as storage means for the file list creation server 1. The storage device 15 stores a list of indexed files 16. The list of indexed files 16 stores the URL of at least one search target file 32 stored in a storage device 31 on the file server 3.

A search index creation server 5 connected to the servers and the like so as to be able to communicate with the servers and the like updates search indices. Then, the file list creation server 1 reflects additions, updates, or deletions of indexed files in the list of indexed files 16.

The file list creation server 1 includes a scheduler 11, file scan process division policy determination means 12, file scan execution means 13, and file list comparison means 14.

Furthermore, the file list creation server 1 includes a CPU, a main storage device and the like. The CPU loads a program such as the file list comparison means or the like stored in the storage device 15 onto the main storage device, and executes the operation code of the program to carry out various types of processing.

The scheduler 11 periodically creates a list of added, updated, or deleted file data. In this case, the scheduler 11 references time intervals for execution of a list creation process stored in the storage device 15 to activate the file scan process division policy determination means 12 and then the file scan execution means 13 and the file list comparison means 14. The scheduler 11 thus creates a list of indexed files 16 and then a list of added, updated, or deleted file data.

Figure 4:
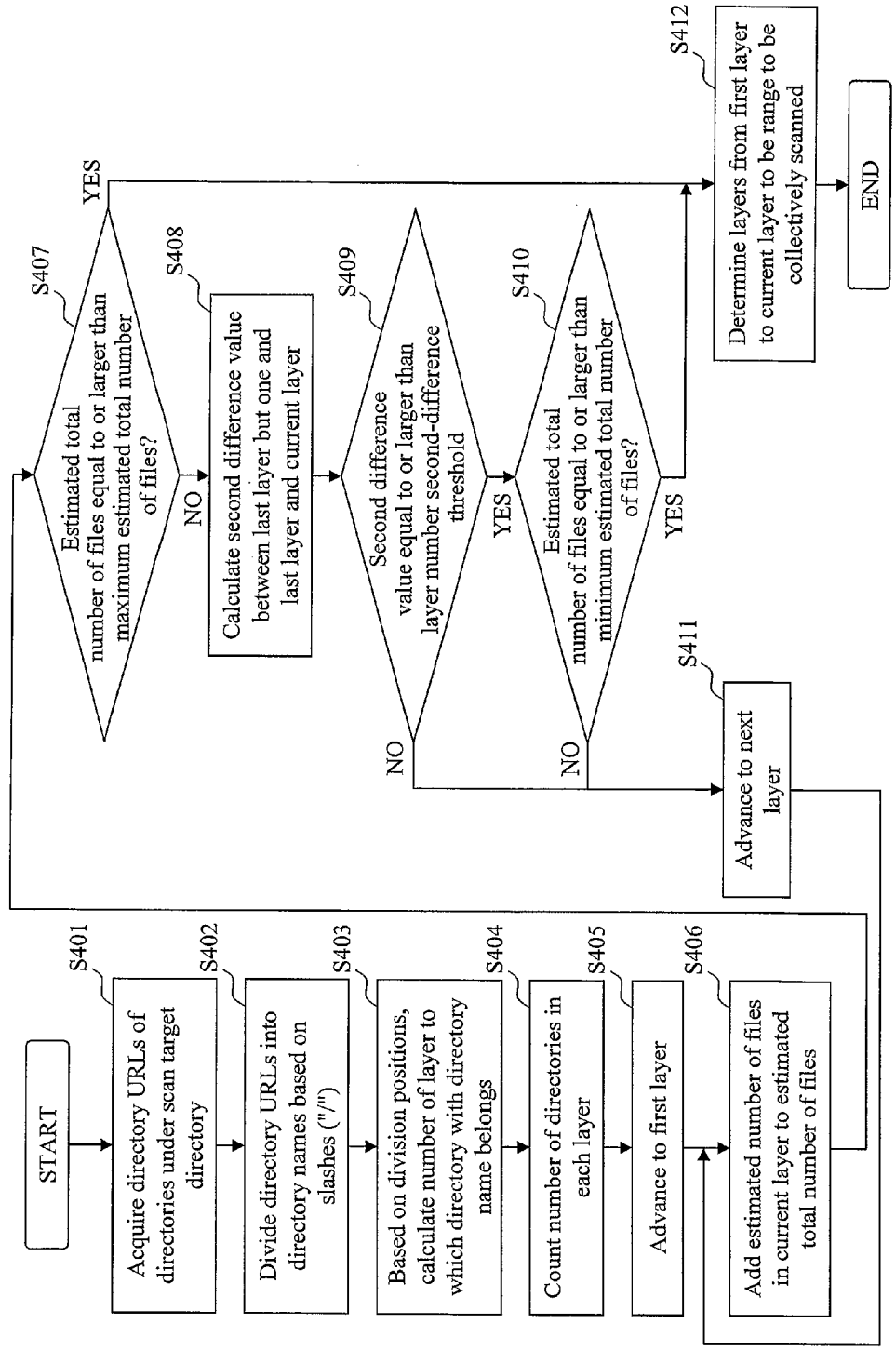
FIG. 4 is a flowchart of a process of analyzing a file tree and determining a division policy for a file scan process.

The file scan process division policy determination means 12 analyzes the list of indexed files 16 stored in the storage device 15 to determine a policy regarding how to divide a file scan process into sub-processes and to carry out the sub-processes in parallel. This operation will be described below as a file scan process division policy determination process (FIG. 4).

Based on the division policy for the file scan process determined by the file scan process division policy determination means 12, the file scan execution means 13 scans search target files 32 stored in the storage device 31 for the file server 3. The file scan execution means 13 thus creates a list of the file data currently present on the file server 3.

Figure 5:
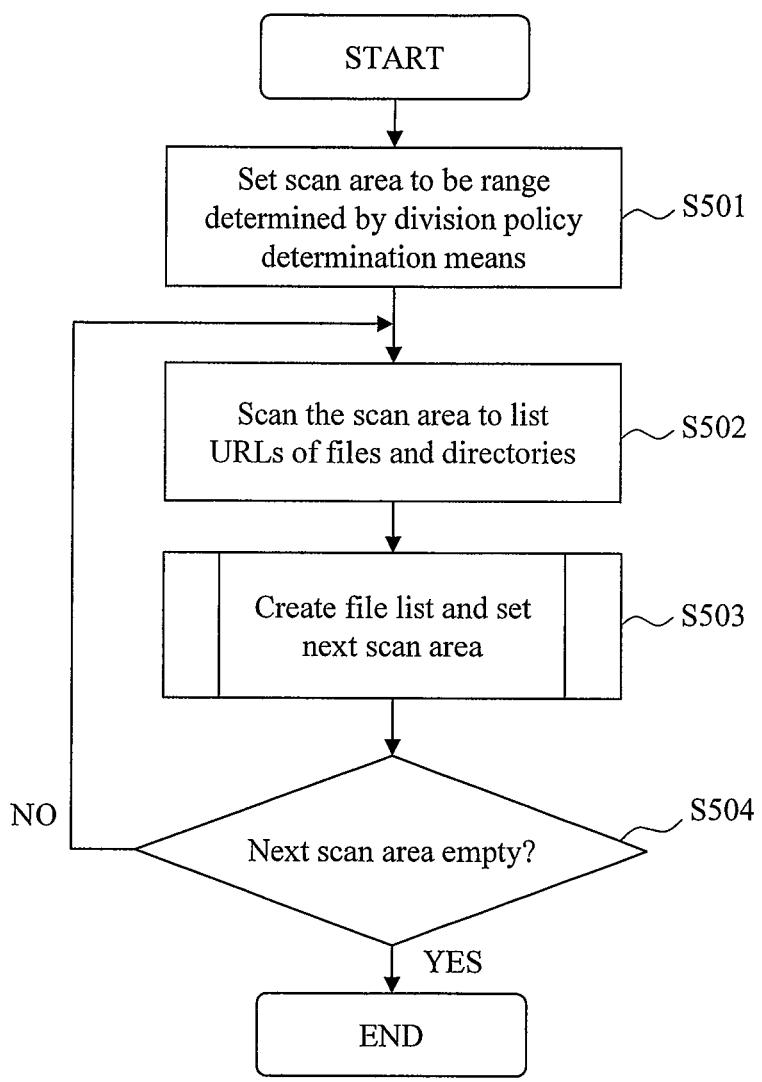
FIG. 5 is a flowchart of a process of comparing the list of indexed files with a list of files on a file server which list is obtained by a file server scan execution means to create a list of added, changed, or deleted file data.

The file list comparison means 14 compares the list of the file data currently present on the file server 3 which list has been created by the file scan execution means 13 with the list of indexed files 16 stored in the storage device 15. The file list comparison means 14 thus creates a list of added, updated, or deleted file data. This operation will be described below as a file scan process (FIG. 5).

Figure 2:
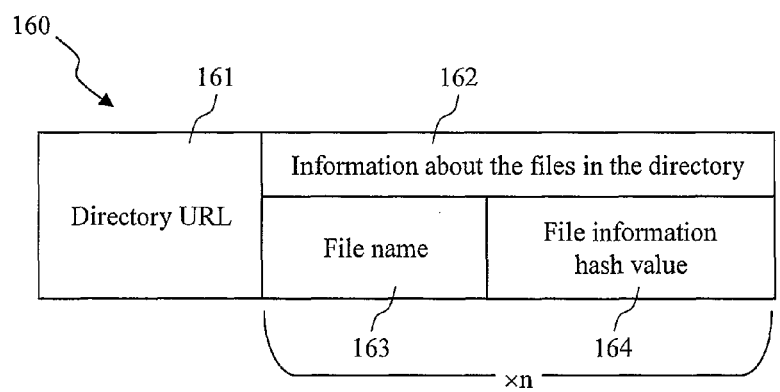
FIG. 2 is a diagram of a configuration of data in a list of indexed files.

FIG. 2 is a diagram of a configuration of data in a file record 160 which is a component of the list of indexed files 16.

The list of indexed files 16 is formed of at least one indexed file record 160. Two separate pieces of information on each file with search indices already created therefor, that is, a directory URL 161 and information about the files in the directory 162, are stored in the indexed file record 160.

Specifically, a path uniquely identifying a directory on the file server is set in the directory URL 161. For example, for a file server with the identifier "server1", a URL indicative of a directory named etc and located immediately below a shared directory with the share name share1 is http://server1/share1/etc/.

The information about the files in the directory 162 is formed of a file name 163 and a file information hash value 164. In the information about the files in the directory 162, a number of information, the number being same as a number of (n) files located immediately below the directory, is stored for one directory URL 160. Specifically, in the file name 163, file names such as file1.doc and file2.xml are stored.

As the file information hash value 164, hash values are stored each of which is used to determine whether or not a file has been updated and which is created from metadata on the file. For example, when a file is determined to have been updated if a last update time for the file or the size of the file has been changed, a string of the last update time for the file and a string of the file size are concatenated together to calculate a hash value for the strings, which is then stored.

Here, the last update time and the file size are illustrative. The hash value may be calculated based on access right information on the file and its higher directory so that, for example, the file can be determined to have been updated if the access right information has been changed by an administrator or the like.

Figure 3:
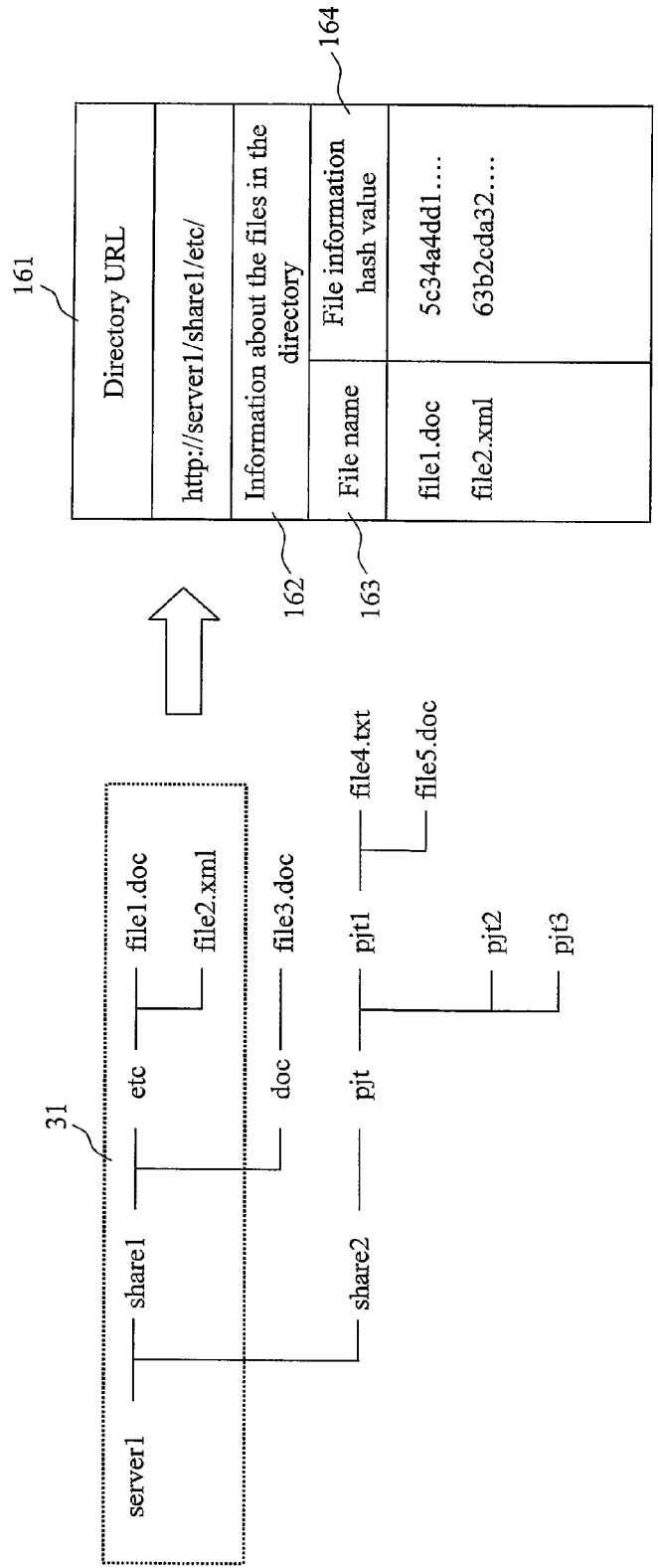
FIG. 3 is a conceptual drawing of the list of indexed files.

FIG. 3 is a conceptual drawing showing a specific example of the list of indexed files 16.

In the configuration of the file server 3 shown in the conceptual drawing, the identifier of the file server 3 is "server1". In "server1", two directories are shared and can be uniquely identified by the share names "share1" and "share2", respectively. In "share1" and "share2" of "server1", directories and files as shown in FIG. 3 are present. For example, under "share1" of "server1", two directories "etc" and "doc" are present. In the "etc" directory, two files "file1.doc" and "file2.xml" are present. In the "doc" directory, one file "file3.doc" is present.

Similarly, under "share2" of "server1", one directory "pjt" is present. In the "pjt" directory, three directories "pjt1", "pjt2", and "pjt3" are present. In the "pjt1" directory, two files "file4.txt" and "file5.doc" are present.

For example, as data in the list of indexed files 16 which corresponds to a portion 31 enclosed by a dotted line in FIG. 3, the value "http://server1/etc/" is stored in the directory URL 161. The following are also stored: a record including the file name 163 "file1.doc" in the information about the files in the directory 162 and the file information hash value 164 "5c34a4dd1B46183A58ABC2B2C8F1B1D58EA34FC6-5DA8EB25B9FFD1A6131308CC", and a record including the file name 163 "file2.xml" and the file information hash value 164 "63b2cda32728C336134A8836A7-65270710D6712F11B2BEE0FA68715D7FDE74A3".

FIG. 4 is a flowchart showing operation of the file scan process division policy determination means 12.

The file scan process division policy determination means 12 operates as follows to achieve the object of the present invention to divide a file tree structure to be scanned into a plurality of portions and to carry out a scan process on these portions in parallel to speed up the process. To prevent the overhead of the parallel process from overcoming increased process speed resulting from the parallel process if the divided rage is excessively small, the file scan process division policy determination means 12 analyzes a list of indexed files to determine an appropriate range to be initially scanned. Such a determination process is suitable for a file tree structure to be scanned which has a triangular structure in which a higher layer closer to a scan process starting directory has a smaller number of directories, whereas a lower layer has a larger number of directories. In particular, for a triangular structure having an inconstant rate of increase in the number of directories among the layers, with the rate increasing rapidly between middle layers, a range from the highest layer to a layer located immediately before a rapid increase in the rate of increase is set to be the first scan area.

Figure 13:
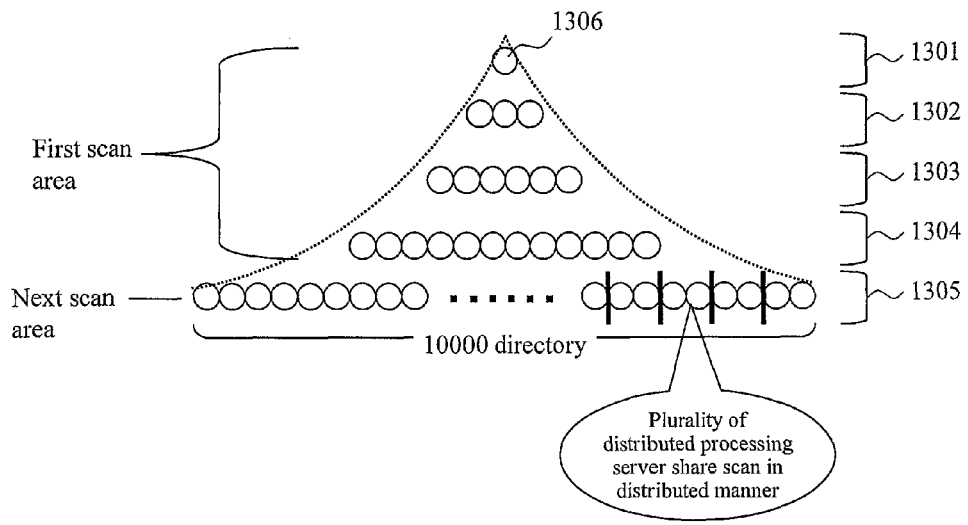
FIG. 13 is a conceptual drawing of a file tree as configured such that the rate of increase in the number of directories in layers increases rapidly in the middle of the file tree.

FIG. 13 is a conceptual drawing of a file tree as configured such that the rate of increase increases rapidly between middle layers. Each circle 1306 in FIG. 13 represents one directory. Files are present under each directory. Furthermore, each directory in a certain layer belongs to one of the directories in a layer higher than the certain layer.

In the file tree structure in the file server 3 shown in the conceptual drawing, one directory belongs to a first layer 1301, and three directories belong to a second layer 1302. Six directories belong to a third layer 1303, 12 directories belong to a fourth layer 1304, and 10,000 directories belong to a fifth layer 1305. A file server with such a file tree structure may be an intra-corporate file server constructed according to the hierarchy of the corporate organization. For example, if a directory in the first layer 1301 is for a "head quarter", directories in the second layer 1302 are for "departments", directories in the third layer 1303 are "sections", and directories in the fourth layer 1304 are for "employees", the file tree structure has such a ratio of the numbers of directories as described above. The rate of increase in the number of directories among the layers can be approximately calculated by the second differences values among the numbers of directories in the corresponding layers.

As shown in a diagram in FIG. 14, the second difference value is defined as follows. When a first difference value is defined as the difference in the number of directories between a certain layer and a layer immediately below the certain layer, the second difference value may be defined as the difference between the first difference value and the number of directories in a layer immediately below the layer immediately below the certain layer. This corresponds to an approximation of a second-order differential equation.

Figure 14:
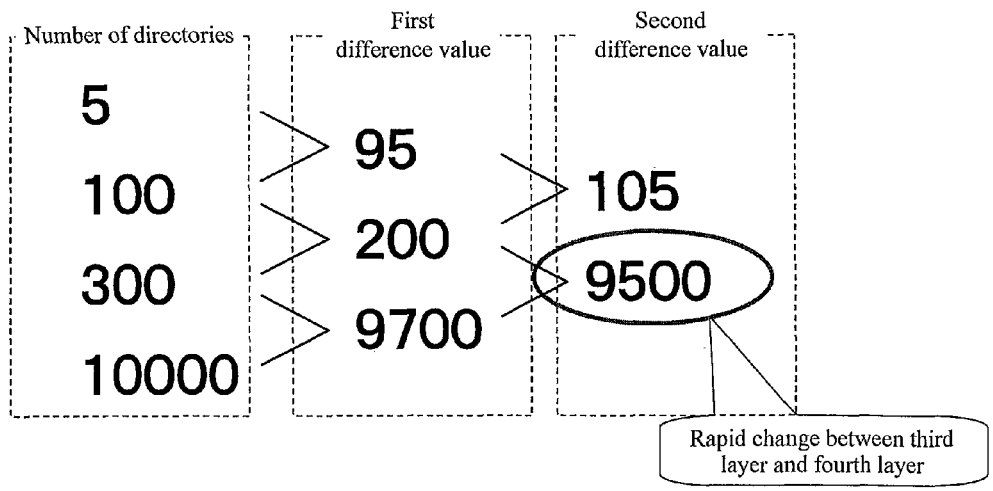
FIG. 14 is a diagram illustrating a second difference value allowing detection of layers between which the rate of increase in the number of directories increases rapidly.

In the diagram in FIG. 14, the second difference value in the number of directories between the third layer and the fourth layer changes rapidly. Thus, the rapid change in the number of directories occurring at the fourth layer can be approximately detected.

In the example in FIG. 13, the second difference value between the first layer 1301 and the second layer 1302 and the third layer 1303 is 1. The second difference value between the second layer 1302 and the third layer 1303 and the fourth layer 1304 is 3. The second difference value between the third layer 1303 and the fourth layer 1304 and the fifth layer 1305 is 9,982. A comparison of the second difference values indicates that the rate of increase increases rapidly between the fourth layer 1304 and the fifth layer 1305. The file scan process division policy determination means 12 uses this technique to set a range from the highest layer 1301 to the fourth layer 1304, corresponding to one division depth, to be the first scan area.

Each of the fourth layer set to be included within the first scan area and the layers below the fourth layer has a large number of directories. Thus, each of the directory layers below the fourth layer is scanned as one depth unit to create a list of files on the directories in the directory layer.

For each of the fifth layer and the layers below the fifth layer which have a large number of directories, the scanning of the directories belonging to the layer is shared by a plurality of distributed processing server groups 2. In this case, the manner of the sharing is optional.

Furthermore, if the counted number of the directories in all the layers down to the lowest layer is very small and is less than a predetermined number, the division number is set to 1 for scanning because the divisional scanning in this case goes against the purpose of increasing the scan speed.

Thus, the present embodiment determines a directory tree reflecting a directory structure of search target files present immediately after creation of search indices. The present embodiment then scans all the search target files (the first scan, the next scan, the scan after the next scan, . . . ) to determine a directory tree reflecting files added to or removed from the directory tree present immediately after creation of search indices and serving as an original tree. Furthermore, if no directory has been added but a file with its contents updated is found, the corresponding directory with its hash value updated is determined.

Figure 15:
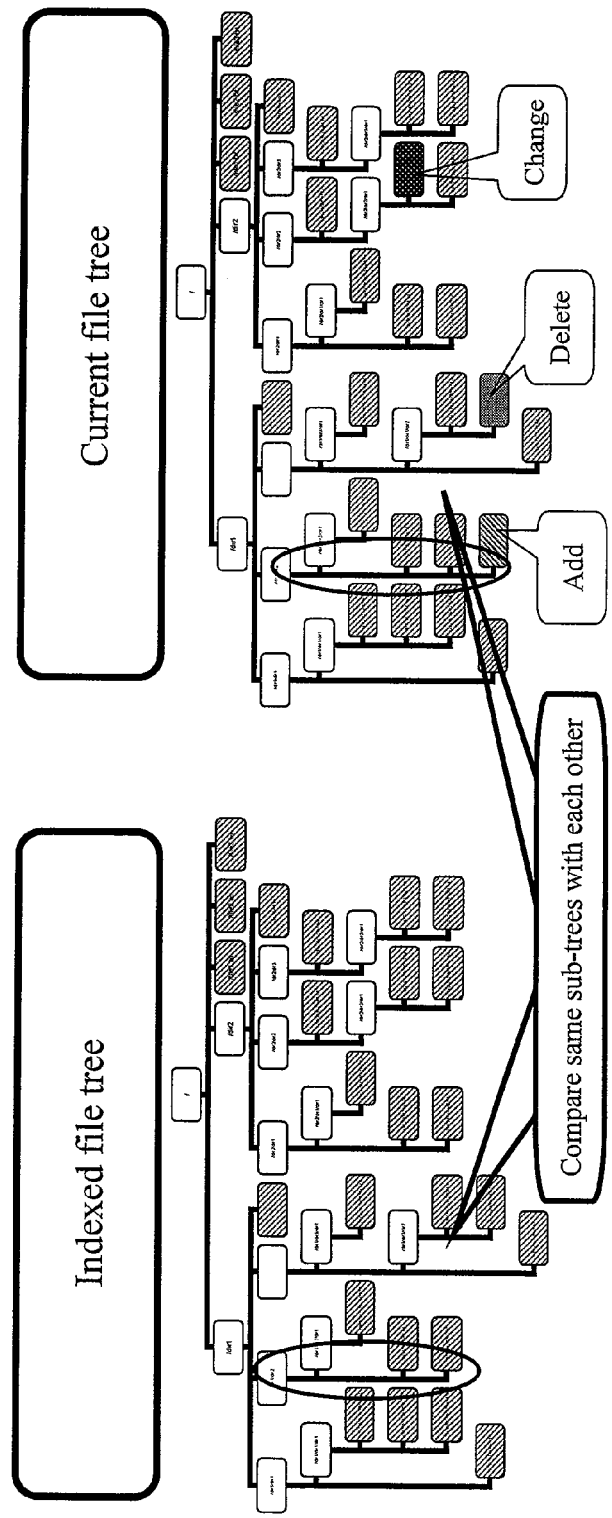
FIG. 15 is a diagram showing an example of a directory tree present immediately after creation of indices and the updated directory tree.

FIG. 15 shows a diagram of the original directory tree present immediately after creation of indices and the updated directory tree.

Thus, a list of added, deleted, or updated files can be extracted by comparing the original tree with the latest tree reflecting the additions, deletions, and updates through comparison of file lists (URL lists). In this case, a list of added, deleted, or updated files can be extracted at a high speed by allowing distributed process execution means 21 of the distributed processing server group 2 to carry out the process of comparing the file lists with each other, in a distributed manner.

Thus, the first scan allows the directory structure of less than a predetermined number of layers with not large numbers of directories to be determined at a time. Lower layers with larger numbers of directories are scanned layer by layer to determine the directory structure of each layer.

In the processing from beginning to S401 in FIG. 4, as described above, to periodically create a list of added, updated, or deleted file data the scheduler 11, the scheduler 11 references time intervals for execution of a list creation process stored in the storage device 15 to allow the processing to be started.

First, the URLs 161 of all the directories related to the shared directories in the file server 3 to be scanned (the URLs of all the scan target directories) are acquired from the list of indexed files 16 stored in the storage device 15 (S401).

Then, each of the directory URLs 161 acquired is divided into directory names on a file path based on the character "/" (S402). For example, in the above-described example, "http://server1/share1/etc/" is divided into "http:", " " (empty string), "server1", "share1", and "etc".

Then, to which of the layers on the file path each of the resulting directory names belongs is determined, that is, the layer number for the directory name is calculated (S403). For example, in the above-described example, "share1" in "http://server1/share1/etc/" is determined to be the first layer, and "etc" is determined to be the second layer.

Then, the number of directories in each layer is counted. For example, in the file tree shown in FIG. 3, the number of directories in the first layer related to the shared directory "share1" is calculated to be one ("share1"). Similarly, the number of directories in the second layer related to the shared directory "share1" is calculated to be two ("etc" and "doc"). S402 and S403 can be carried out on the directories by the plurality of distributed processing server groups 2 in parallel utilizing the distributed process execution means 21. For example, every 5,000 lines of directory URLs 161 are distributed among the distributed processing server groups 2, each of which then carries out the process in S402 and S403 on each of the directory URLs 161 assigned to the distributed processing server group 2.

Then, the number of unique directory names in each layer is counted to determine the number of directories in the layer (S404). S404 can be carried out on the directories by the plurality of distributed processing server groups 2 in parallel utilizing the distributed process execution means 21. For each of the layer numbers calculated in S403, the directory names are distributed among the distributed processing server groups 2. Each of the distributed processing server groups 2 carries out a process, in S404, of counting the number of unique directories in the layer assigned to the distributed processing server group 2.

S402 to S404 correspond to a process of analyzing the file tree structure.

Then, further processing is carried out on the first of the layers for which the counting has been completed (S405).

Then, the estimated number of files in the first layer is calculated and added to the estimated total number of files (S406). The estimated number of files is calculated by multiplying the number of directories in the first layer calculated in S404, by a given number. The given number is, for example, 100. This value is obtained by referencing the appropriate value in a setting file or the like on the file list creation server 1. The value is desirably set by estimating a value close to the average value for the files held by one directory.

Then, whether the estimated total number of files is equal to or larger than the maximum estimated total number of files is determined (S407). The maximum estimated total number of files is obtained by referencing the appropriate value stored in the setting file or the like on the file list creation server 1. This value is, for example, 20,000,000 and is desirably set by estimating the number of files that can be completely scanned at least within several hours by one file server scan. If the estimated total number of files is equal to or larger than the maximum estimated total number of files, a range from the first layer to the current layer are determined to be collectively scanned (S412). That is, in this case, only the first layer is determined to be scanned. The maximum estimated total number of files is set in order to prevent the range of collectively scan targets from being endlessly extended.

If the estimated total number of files is smaller than the maximum estimated total number of files, then the second difference value between the layer before the last layer and the last layer and the current layer is calculated (S408). The first layer involves neither the layer before the last layer nor the last layer, and thus the number of directories in the first layer is determined to be the second difference value.

Then, whether the second difference value is equal to or larger than a layer number second-difference threshold is determined (S409). The layer number second-difference threshold is obtained by referencing the appropriate value stored in the setting file or the like on the file list creation server 1. This value approximately indicates how rapid the rate of increase in the number of directories increases among the layers, and is set to, for example, 5,000.

If the second difference value is equal to or larger than the second difference threshold, then whether the estimated total number of files is equal to or larger than the minimum estimated total number of files is determined (S410). The minimum estimated total number of files is obtained by referencing the appropriate value stored in the setting file or the like on the file list creation server 1. This value is, for example, 1,000,000, and is set by estimating the number of files that it takes at least several minutes for one file list creation server 1 to scan during one file server scan.

If the estimated total number of files is equal to or larger than the minimum estimated total number of files, the range from the first layer to the current layer are determined to be collectively scanned (S412).

If the determination in S410 indicates that the estimated total number of files is smaller than the minimum estimated total number of files, the process proceeds to the next layer (S411). The process in FIG. 4 is to prevent an excessively small range from being set to be a scan area. Thus, the determination process in S410 is added in order to include a given number of files within the scan area.

If the determination in S409 indicates that the second difference value is smaller than the second difference threshold, the process proceeds to the next layer (S411).

After proceeding to the next layer in S411, the process returns to S406. Either the determination in S407 or the determination in S409 and S410 determines the scan area, and thus the processing from S406 to S411 is repeatedly carried out.

The above-described process determines the appropriate range of the scan process carried out first by the file scan execution means 13.

FIG. 5 is a flowchart showing the operation of a process of creating a list of added, updated, or deleted files by the file scan execution means 13 and the file list comparison means 14.

After the process shown in the flowchart in FIG. 4 ends, the scheduler 11 activates a process shown in FIG. 5.

The range determined by the division policy determination means as shown in the flowchart in FIG. 4 is set to be a scan area (S501).

Then, the files within the scan area are scanned to list the URLs of files and directories (S502).

Scanning a partial range of the file server 3 to list files and directories is a well-known technique. Thus, how the file scan execution means 13 carries out a scan is not described herein in detail. However, for example, the file list creation server 1 may make the search target files 32 in the storage device 31 for the file server 3 accessible through the network file system and use a file tree search program for local files in the file list creation server 1 to output a list of file paths on a file system of each file data. Determination of the file path on the file system allows URLs to be created by adding the identifier of the file server 3 or the like to the file path.

Then, a file list is created, and the next scan area is set (S503). The next scan area is set as follows: the directories in the lowest layer of the range scanned in S502 are set, and one layer immediately below the directories is set to be the scan area. That is, during each of the scans following the first scan set in S501, one layer of the file tree is scanned. This process will be described below in detail as a process of creating a file list and setting the scan area (S601 and other steps).

Then, whether the next scan area is empty is determined (S504).

If the next scan area is empty, all of the file tree has been searched, and thus the process is terminated.

If the next scan area is not empty, the process returns to S502 to scan the next scan area to list the URLs of the files and directories.

Figure 6:
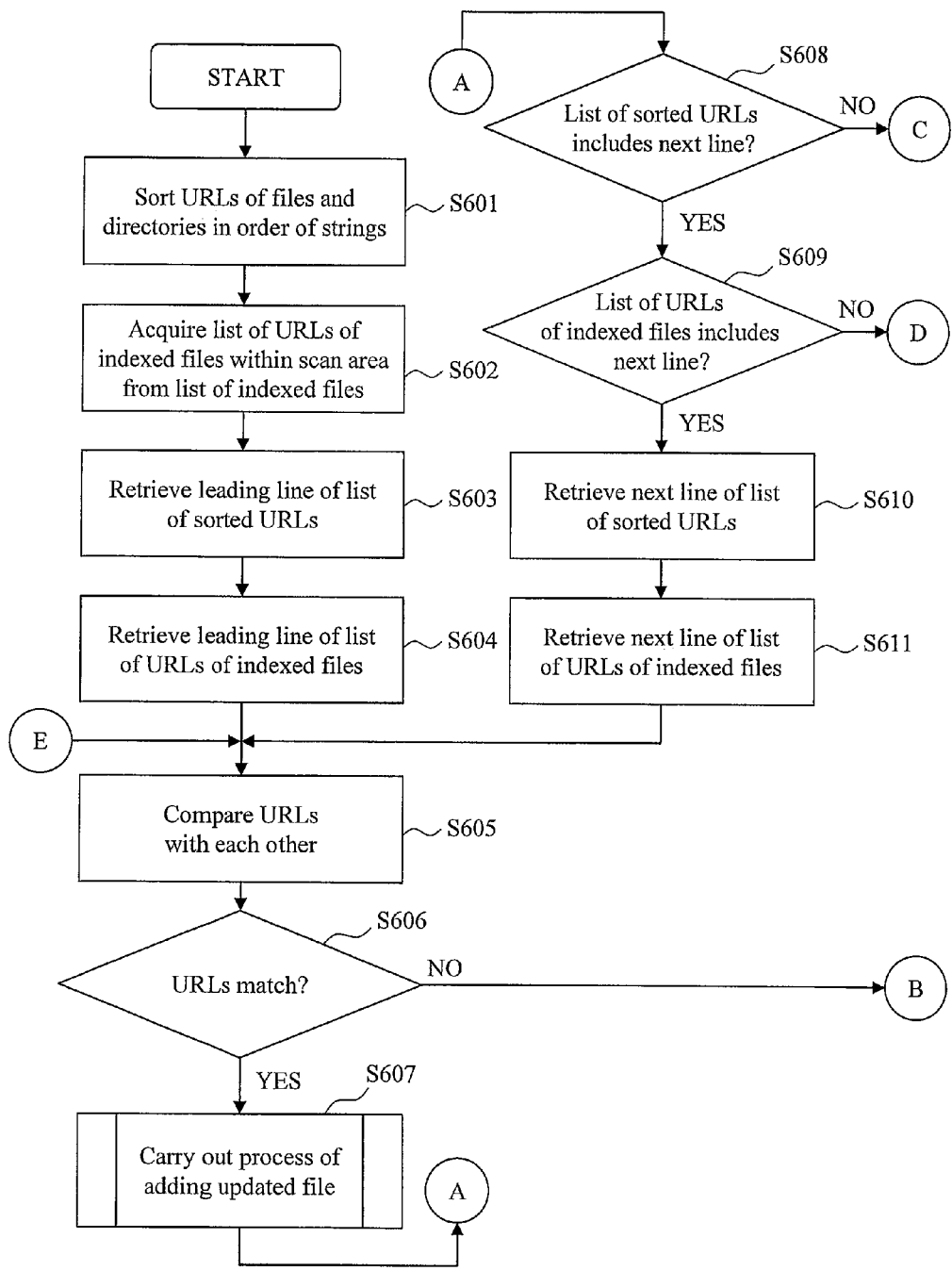
FIG. 6 is a flowchart showing a process of creating a file list and setting a scan area.
Figure 7:
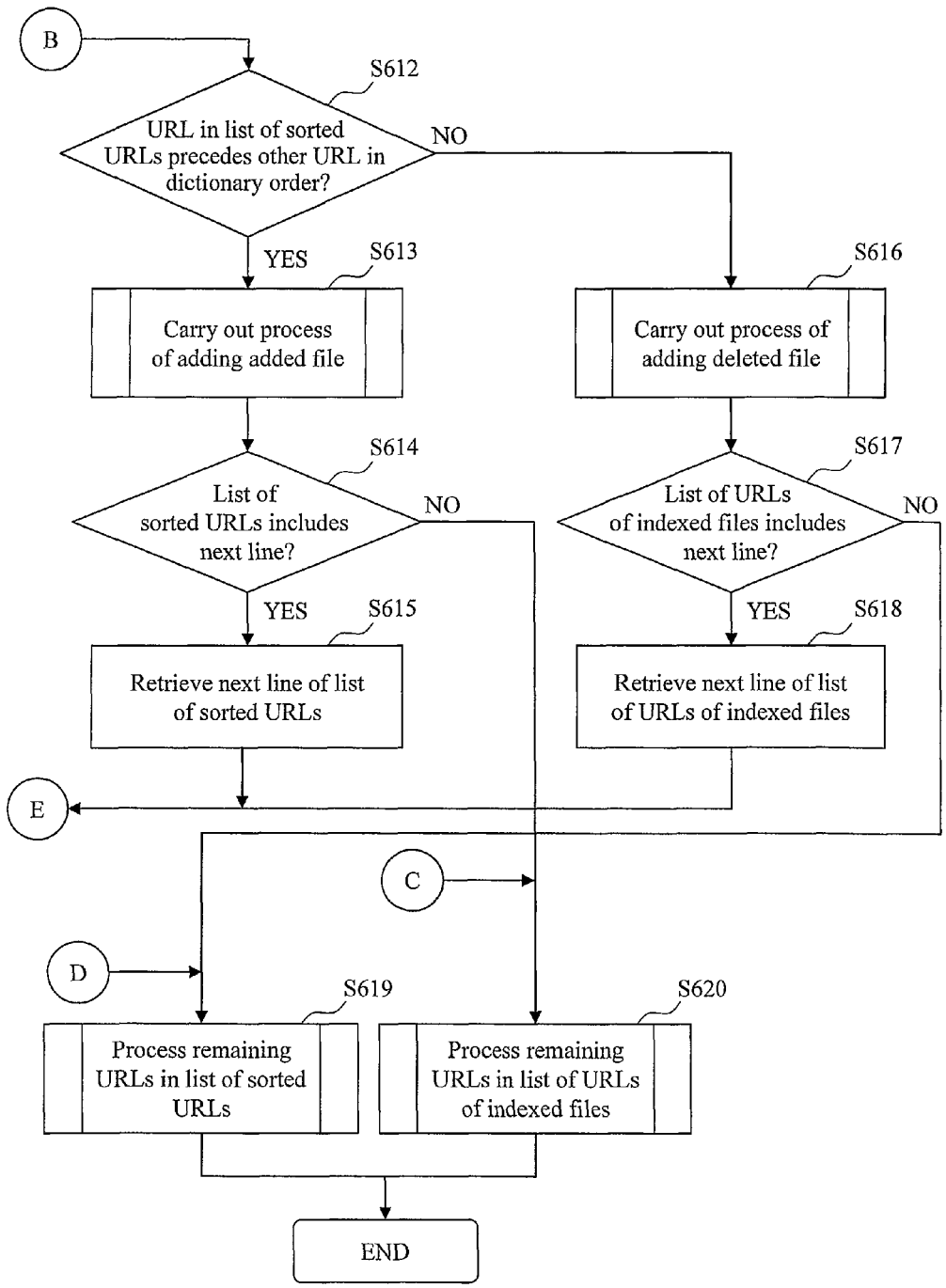
FIG. 7 is a flowchart continued from FIG. 6.

FIG. 6 and FIG. 7 are flowcharts showing the operation of the process of creating a file list and setting the scan area. This is a detailed flow of the process in S503 in FIG. 5.

First, the URLs of the files and directories listed in S502 are sorted in order of the strings (S601).

Then, a list of the URLs of the indexed files within the scan area is acquired from the list of indexed files 16 (S602). A list of the URLs of the indexed files can be created by extracting all the records of the directory URLs 161 included within the scan area from the list of indexed files 16 and connecting the file names 163 included in the records together to create the URLs of the files. Here, the scan area can be represented by the number of layers. The number of layers can be calculated from the number of slashes ("/") included in the directory URL. Hence, the records of the directory URLs 161 within the scan area can be extracted by for example, creating a normal expression containing a specified number of slashes ("/") and extracting directory URLs compatible with the normal expression.

Then, the leading line of the list of the sorted URLs is retrieved (S603). This URL is the leading one, in dictionary order (alphabetical order), of the file URLs of the search target files 32 included within the scan area on the file server 3.

Then, the leading line of the list of the URLs of the indexed files is retrieved (S604). This URL is the leading one, in dictionary order, of the file URLs of the files included within the scan area and contained in the list of indexed files 16 stored in the storage device 15.

Then, the URLs retrieved in S603 and S604 are compared with each other as strings (S605).

Then, based on the result of the comparison in S605, whether the URLs match as strings is determined (S606).

The matching URLs means that the URL of the file or directory currently present on the file server 3 matches the URL of the file or directory in the list of indexed files. Thus, this file or directory can be determined not to be a file or directory newly added to the file server 3 or a file or directory indexed during the last operation and then deleted but to be a file or dietary which has not been changed or which is likely to have been updated. Then, a process is carried out which includes determining the file or directory to be likely to have been updated and adding the file or directory to the list of added, updated, or deleted files (S607). This process will be described below in detail as a process of adding an updated file (S901 and other steps).

Then, whether the list of sorted URLs includes the next line is determined (S608).

If the list of sorted URLs includes the next line, then whether the list of the URLs of the indexed files includes the next line is determined (S609).

If the list of the URLs of indexed files includes the next line, then the next line of the list of sorted URLs is retrieved (S610).

Then, the next line of the list of the URLs of indexed files is retrieved (S611).

Then, the process returns to S605 and compares the next URLs with each other. The above-described processing is repeatedly carried out until the processing is performed on all the URLs in the list of sorted URLs and in the list of the URLs of indexed files.

If the determination in S608 indicates that the list of sorted URLs does not include the next line, a process is carried out which includes determining the URLs remaining in the list of the URLs of indexed files to indicate deleted files or directories and adding the URLs to the list of added, updated, or deleted files (S620 in FIG. 7). This process will be described below in detail as a process carried out on the remaining URLs in the list of the URLs of indexed files (S701 and other steps).

If the determination in S609 indicates that the list of the URLs of indexed files does not include the next line, a process is carried out which includes determining the URLs remaining in the list of sorted URLs to indicate added files or directories and adding the URLs to the list of added, updated, or deleted files (S619 in FIG. 7). This process will be described below in detail as a process carried out on the remaining URLs in the list of sorted URLs (S801 and other steps).

If the determination in S606 indicates that the URLs fail to match as strings, whether the URL in the list of sorted URLs precedes the URL in the list of the URLs of indexed files in dictionary order is determined (S612 in FIG. 7).

If the URL in the list of sorted URLs precedes the URL in the list of the URLs of indexed files in dictionary order, this indicates that a file or directory not present in the list of indexed files has newly been created on the file server 3. Thus, a process is carried out which includes determining the URL to correspond to an added file or directory and adding the URL to the list of added, updated, or deleted file data (S613 in FIG. 7). For example, if the URL in the list of the URLs of indexed files is "http://server1/share1/etc/file1.doc" and the URL in the list of sorted URLs is "http://server1/share1/etc/file0.txt", the URL in the list of sorted URLs precedes the URL in the list of the URLs of indexed files in dictionary order. The process can thus determine that the file "http://server1/share1/etc/file0.txt" has newly been created between the last index update and the current indexing. This process will be described below in detail as a process of adding an added file (S1001 and other steps).

Then, whether the list of sorted URLs includes the next line is determined (S614).

If the list of sorted URLs includes the next line, then the next line of the list of sorted URLs is retrieved (S615).

Then, the process returns to S605 and compares the next URLs with each other. At this time, the URL in the list of sorted URLs has advanced to the next line due to the process in S615, whereas the URL in the list of the URLs of indexed files has not advanced to the next line.

If the determination in S614 indicates that the list of sorted URLs does not include the next line, then the remaining URLs in the list of the URLs of indexed files are processed (S620).

If the determination in S612 indicates that the URL in the list of sorted URLs succeeds the URL in the list of the URLs of indexed files in dictionary order, this indicates that a file or directory included in the list of indexed files is not present on the current file server 3. Thus, a process is carried out which includes determining the URL to correspond to a deleted file or directory and adding the URL to the list of added, updated, or deleted file data (S616 in FIG. 7). This process will be described below in detail as a process of adding a deleted file (S1101 and other steps).

Then, whether the list of the URLs of indexed files includes the next line is determined (S617).

If the list of the URLs of indexed files includes the next line, then the next line of the list of the URLs of indexed files is retrieved (S618).

Then, the process returns to S605 and compares the next URLs with each other. At this time, the URL in the list of the URLs of indexed files has advanced to the next line due to the process in S618, whereas the URL in the list of sorted URLs has not advanced to the next line.

If the determination in S617 indicates that the list of the URLs of indexed files does not include the next line, then the remaining URLs in the list of sorted URLs are processed (S619).

As described above, the determination in S605 indicates that the URLs match, both the list of sorted URLs and the list of the URLs of indexed files are advanced to the next line. If the determination in S605 indicates that the URLs fail to match and the determination in S612 indicates that the URL in the list of sorted URLs precedes the URL in the list of the URLs of indexed files in dictionary order, only the list of sorted URLs is advanced to the next line. If the determination in S605 indicates that the URLs fail to match and the determination in S612 indicates that the URL in the list of sorted URLs succeeds the URL in the list of the URLs of indexed files in dictionary order, only the list of the URLs of indexed files is advanced to the next line. When such a method is used to compare the URLs in both URL lists from the leading URL to the trailing URL, all the files that are included within the corresponding range and that have been added, updated, or deleted can be added to the list of added, updated, or deleted file data.

The above-described process allows the creation of a list of file data which is included within the current scan area and which have been added, updated, or deleted, thus determining the next scan area.

Figure 8:
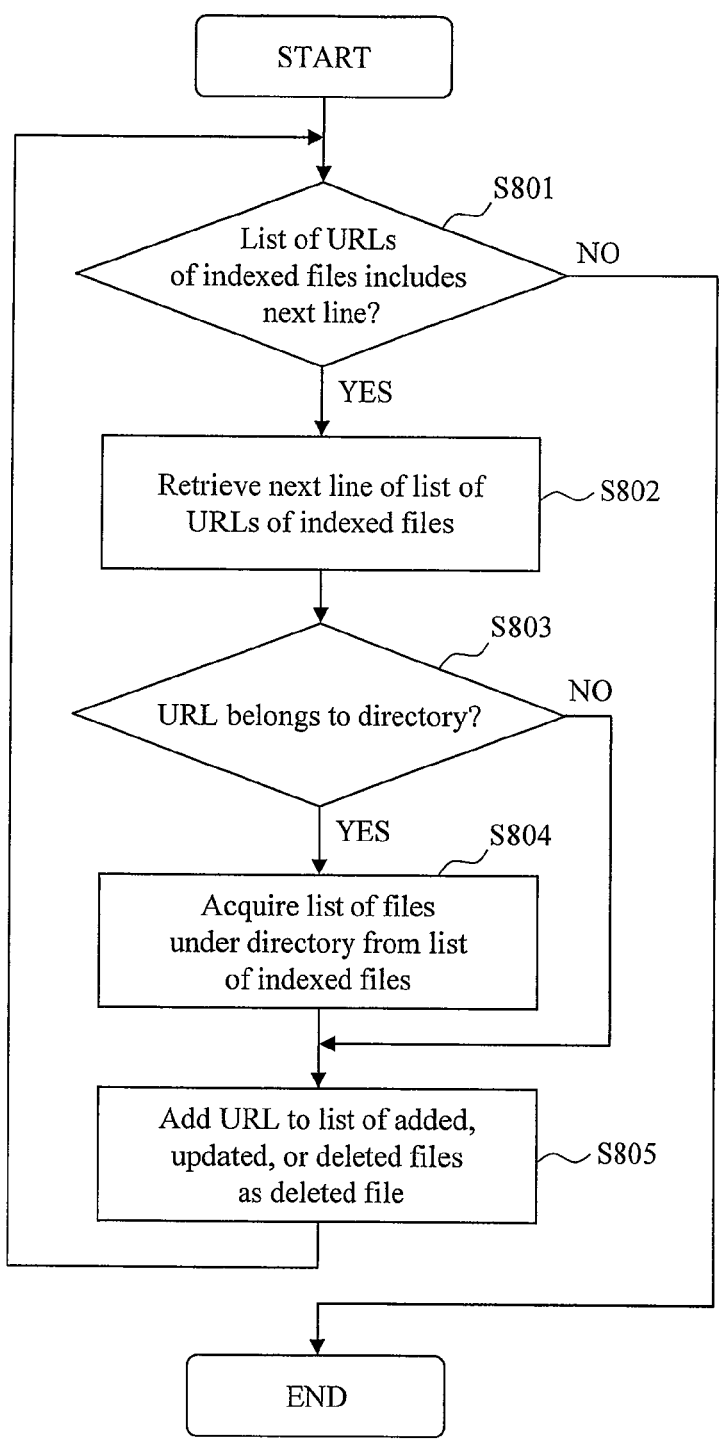
FIG. 8 is a flowchart of a process carried out on remaining URLs in a list of the URLs of indexed files.

FIG. 8 is a flowchart indicative of the operation of the process carried out on the remaining URLs in the list of the URLs of indexed files. This is a detailed flow of the process in S620 in FIG. 7.

First, whether the list of the URLs of indexed files includes the next line is determined (S801). Here, the list of the URLs of indexed files is the same as the list of the URLs of indexed files in the process shown in FIG. 6.

If the list of the URLs of indexed files includes the next line, then the next line of the list of the URLs of indexed files is retrieved (S802).

Then, whether the URL retrieved from the list of the URLs of indexed files belongs to a directory is determined (S803).

If the retrieved URL belongs to a directory, then the files located under the directory indicted by the URL are acquired from the list of indexed files (S804). This is because when a higher directory is deleted from the file tree, all the files and directories under the higher directory are deleted, so that the files present in the list of indexed files all need to be added to the list of added, updated, or deleted files as deleted files. A possible method for acquiring a list of the files under the directory indicated by the URL retrieved from the list of indexed files is, for example, to search for a URL that has a prefix match with the URL retrieved from the list of indexed files.

Then, all the files acquired are added to the list of added, updated, or deleted files as deleted files (S805).

The process returns to S801 to determine whether the list of the URLs of indexed files includes the next line.

If the list of the URLs of indexed files does not include the next line, the process is terminated.

If the list of the URLs of indexed files includes the next line, the processing from S801 to S805 is repeatedly carried out on all the URLs in the list of the URLs of indexed files.

If the determination in S803 indicates that the URL does not belong to a directory but to a file, then the file is added to the list of added, updated, or deleted files as a deleted file (S805).

The above-described process allows addition of the remaining URLs in the list of the URLs of indexed files to the list of added, updated, or deleted files as a deleted file or directory.

Figure 9:
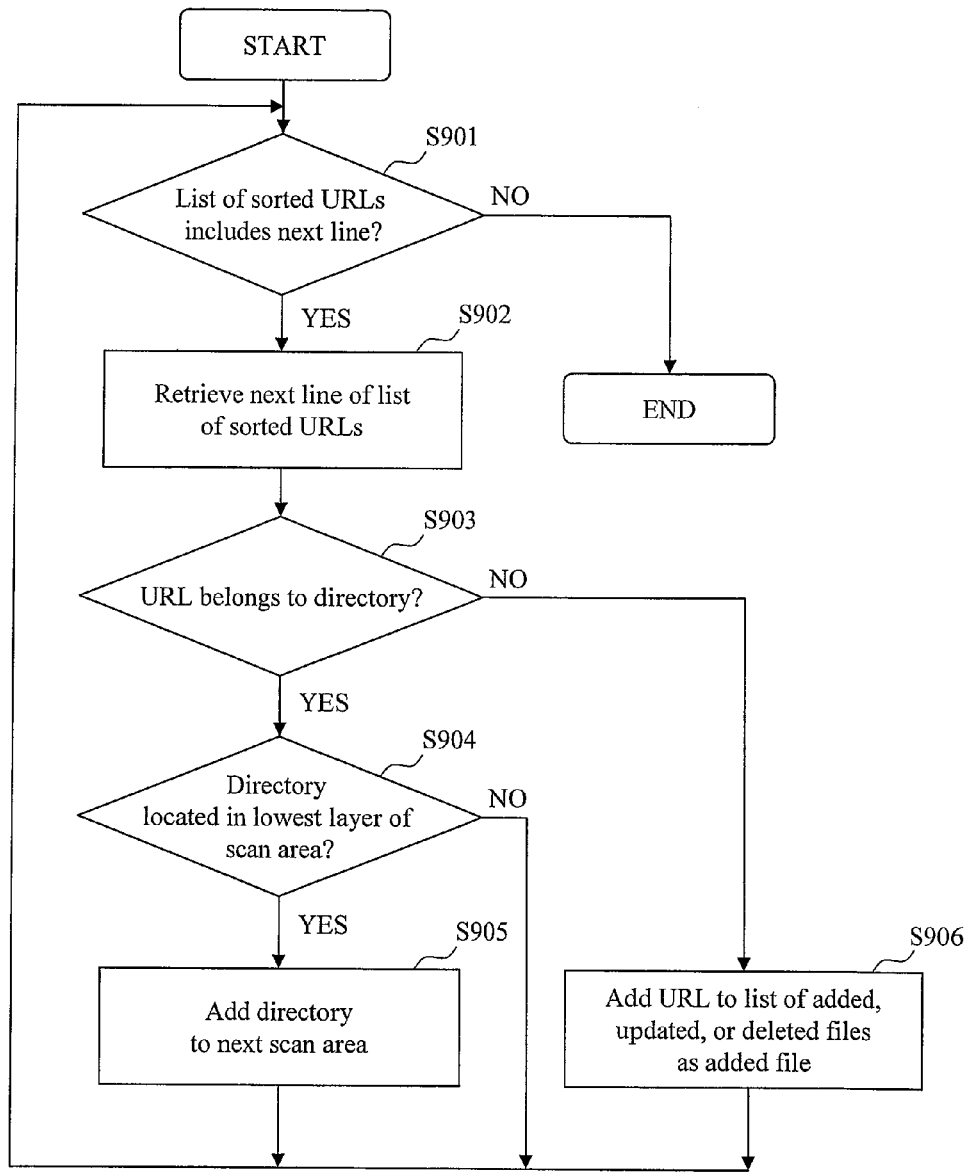
FIG. 9 is a flowchart of a process carried out on remaining URLs in a list of sorted URLs.

FIG. 9 is a flowchart showing the operation of a process carried out on the remaining URLs in the list of sorted URLs. This is a detailed flow of the process in S619 in FIG. 7.

First, whether the list of sorted URLs includes the next line is determined (S901).

If the list of sorted URLs includes the next line, then the next line of the list of sorted URLs is retrieved (S902).

Then, whether the URL belongs to a directory is determined (S903).

Figure 12:
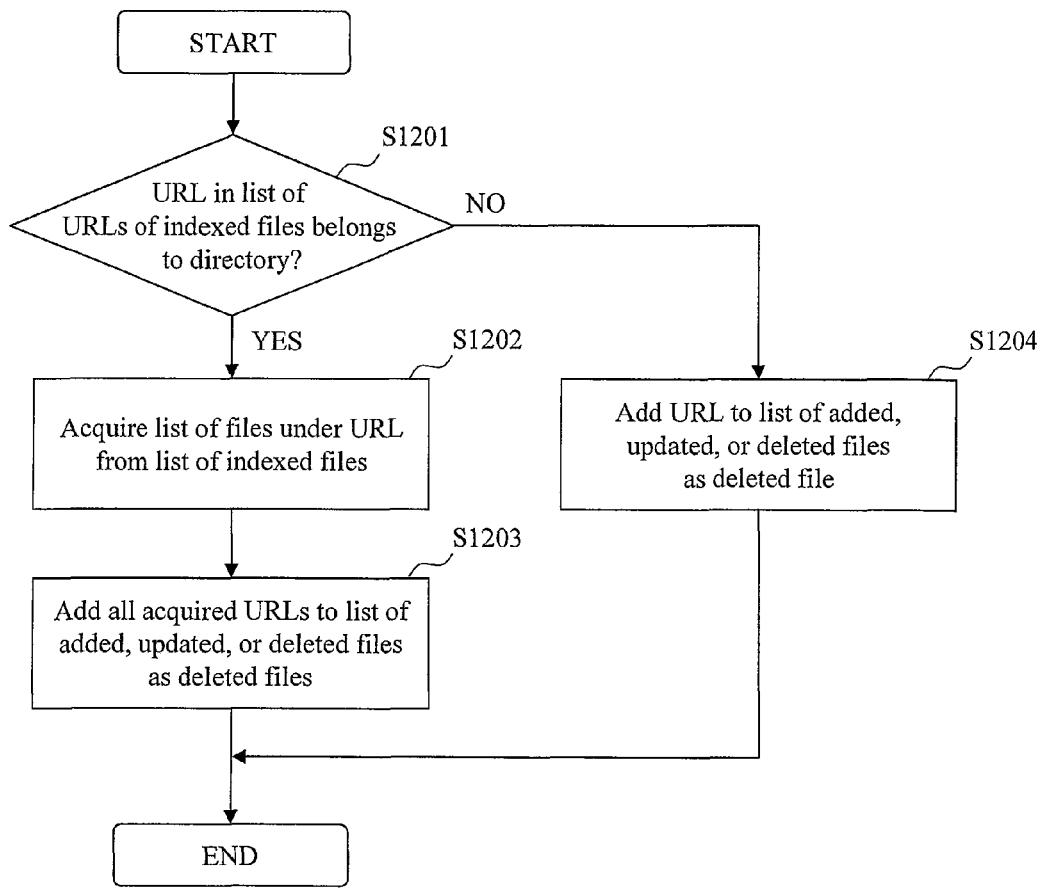
FIG. 12 is a flowchart of a process of adding a deleted file.

If the URL belongs to a directory, then whether the directory is located in the lowest layer of the scan area is determined (S904). For example, if a range from a first layer 1201 to a fifth layer 1205 in a file tree in FIG. 12 is set to be a scan area, the URLs of directories belonging to a fifth layer 1205 are determined to correspond to the directories in the lowest layer.

If the directory indicated by the URL is located in the lowest layer, the directory is included as a starting directory for the next scan area and thus added to the next scan area (S905). The next scan area may be held on the main storage device for the file list creation server 1 or may be temporarily stored in the storage device 15 and loaded for the next process if a large number of directories are added to the next scan area.

If the determination in S904 indicates that the directory is not located in the lowest layer, then the current scan area includes directories in lower layers, and the directory need not be included within the next scan area. Hence, the process returns to S901 to determine whether the list of sorted URLs includes the next line.

If the determination in S903 indicates that the URL does not belong to a directory but to a file, then the file is determined to be an added file and added to the list of added, updated, or deleted files.

Then, the process returns to S901 to determine whether the list of sorted URLs includes the next line.

If the determination in S901 indicates that the list of sorted URLs does not include the next line, the process is terminated.

The above-described process adds a URL remaining in the list of sorted URLs to the list of added, updated, or deleted files if the URL corresponds to a file, and adds the URL to the next scan area if the URL corresponds to a directory in the lowest layer of the scan area.

Figure 10:
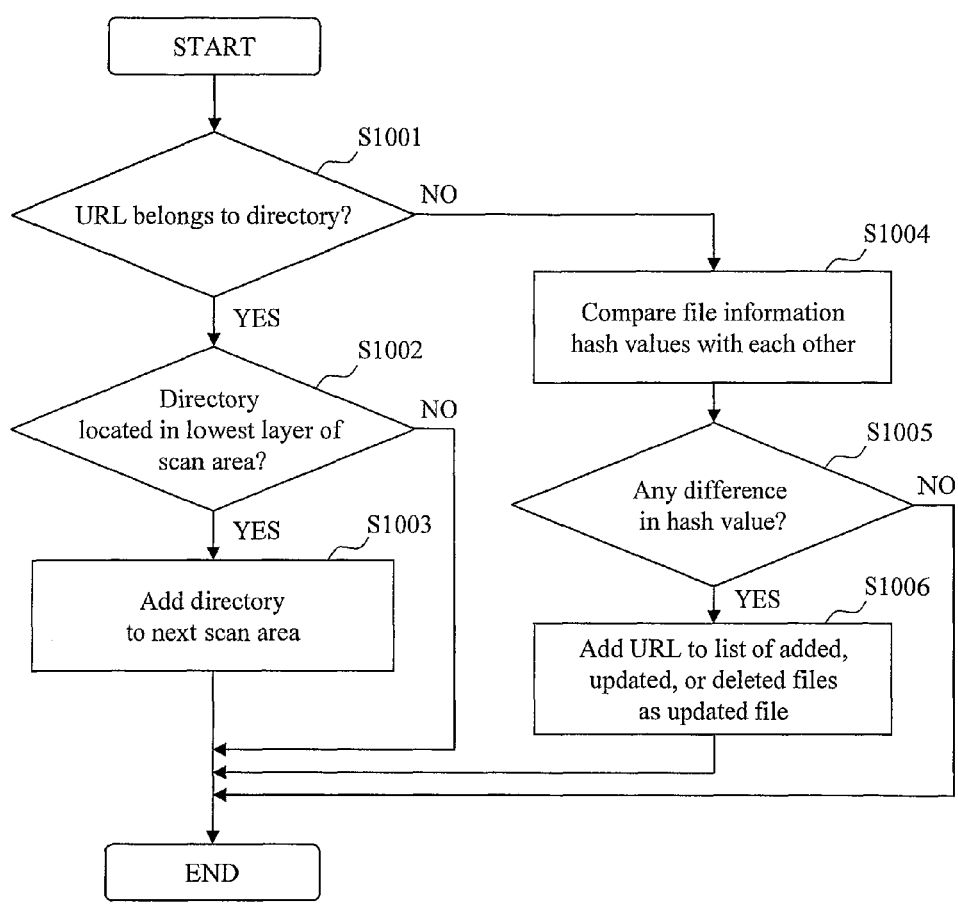
FIG. 10 is a flowchart of a process of adding an updated file.

FIG. 10 is a flowchart showing the operation of a process of adding an updated file. This is a detailed flow of the process in S607.

First, whether the URL belongs to a directory is determined (S1001). The URL has been subjected to the comparison in S605 in FIG. 6 and determined to match the other URL in S606 in FIG. 6. The URL may be retrieved from the list of sorted URLs or from the list of the URLs of indexed files.

If the URL belongs to a directory, then whether the directory is located in the lowest layer of the scan area is determined (S1002).

If the directory indicated by the URL is located in the lowest layer, the directory is included as a starting directory for the next scan area and thus added to the next scan area (S1003).

If the determination in S1002 indicates that the directory is not located in the lowest layer, then the current scan area includes directories in lower layers, and the directory need not be included within the next scan area. Thus, the process is terminated.

If the determination in S1001 indicates that the URL does not belong to a directory but to a file, then a file information hash value 164 for the indexed file corresponding to the URL is compared with a hash value calculated, in a manner similar to the manner for the file information hash value 164, from metadata on the file indicated by a URL in the list of sorted URLs on the file server 3 (S1004).

Then, whether there is any difference between the hash values compared with each other is determined (S1005).

If the determination in S1005 indicates that there is a difference between the hash values, this indicates that the corresponding file has been updated. Thus, the URL is then added to the list of added, updated, or deleted files as an updated file (S1006).

If the determination in S1005 indicates that there is no difference between the hash values, this indicates that the file has not been updated. Consequently, the file need not be added to the list of added, updated, or deleted files. Thus, the process is terminated.

According to the above-described process, if the URL corresponds to a file and has been updated, the URL is added to the list of added, updated, or deleted files as an updated file. Furthermore, if the URL corresponds to a directory located in the lowest layer of the scan area, the URL is added to the next scan area.

Figure 11:
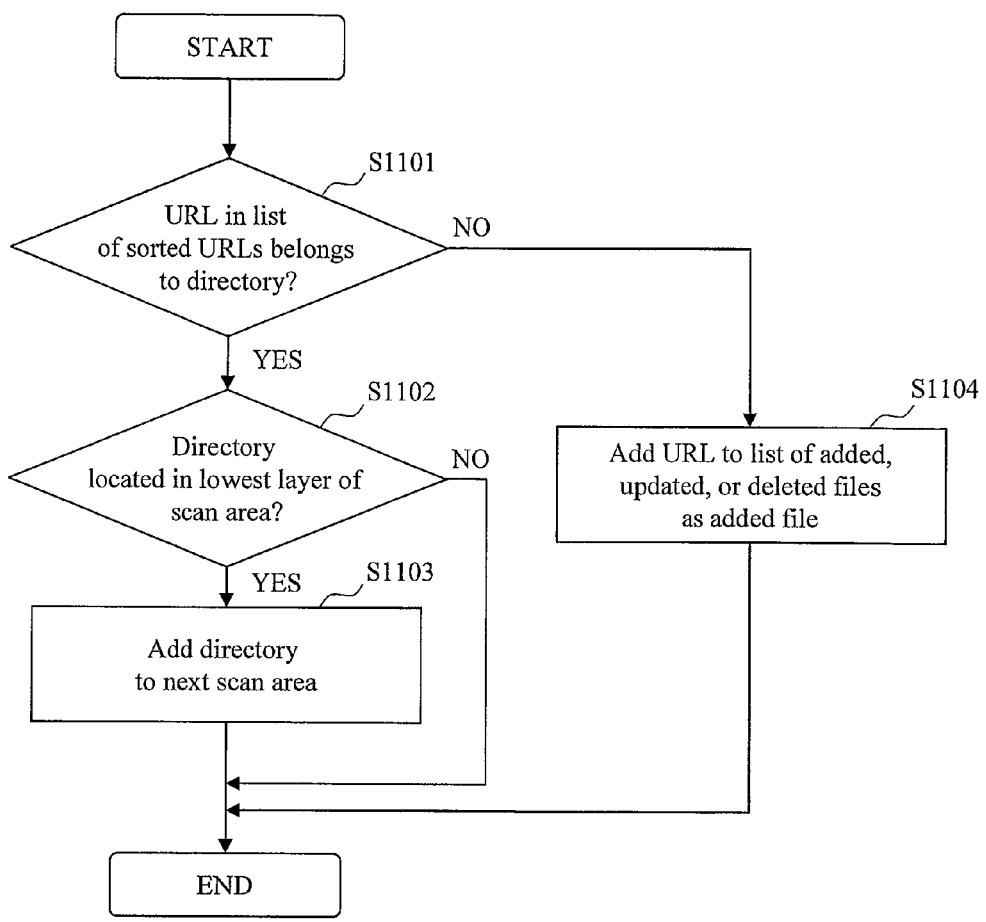
FIG. 11 is a flowchart of a process of adding an added file.

FIG. 11 is a flowchart showing the operation of a process of adding an added file. This is a detailed flow of the process in S613 in FIG. 7.

First, whether the URL in the list of sorted URLs belongs to a directory is determined (S1101).

If the URL belongs to a directory, then whether the directory is located in the lowest layer of the scan area is determined (S1102).

If the directory is located in the lowest layer, then the directory is added to the next scan area (S1103).

If the determination in S1102 indicates that the directory is not located in the lowest layer, then the process is terminated.

If the determination in S1101 indicates that the URL in the list of sorted URLs does not belong to a directory but to a file, then the file is added to the list of added, updated, or deleted files as an added file (S1104).

According to the above-described process, if the URL corresponds to a file, the URL is added to the list of added, updated, or deleted files as an updated file. Furthermore, if the URL corresponds to a directory located in the lowest layer of the scan area, the URL is added to the next scan area.

FIG. 12 is a flowchart showing the operation of a process of adding a deleted file. This is a detailed flow of the process in S616 in FIG. 7.

First, whether the URL in the list of the URLs of indexed files belongs to a directory is determined (S1201).

If the URL belongs to a directory, all the files under the directory need to be added to the list of added, updated, or deleted files as deleted files. Thus, a list of the files under the directory is acquired from the list of indexed files (S1202).

Then, all the files included in the list acquired are added to the list of added, updated, or deleted files as deleted files (S1203).

If the determination in S1201 indicates that the URL in the list of the URLs of indexed files does not belong to a directory but to a file, then the file is added to the list of added, updated, or deleted files as a deleted file (S1204).

The scan in S502 shown in FIG. 5 can be processed by a plurality of distributed processing server groups 2 in parallel utilizing the distributed process execution means 21. If the process in S502 is distributed among the distributed process execution means 21, a given number of the directories set to be included within the scan area are assigned to one distributed process execution means 21. For example, when one distributed process execution means 21 is responsible for up to five directories, if 22 directories are set to be included within the scan area, the process is distributed among the distributed process execution means so that the distributed process execution means are responsible for five directories, five directories, five directories, five directories, and two directories, respectively.

Furthermore, the process of creating a file list and setting the next scan area in S503 shown in FIG. 5 can be carried out by a plurality of distributed processing server groups 2 utilizing the distributed process execution means 21. If the process in S503 is distributed among the distributed process execution means, processing carried out on one directory is assigned to one distributed process execution means 21. For example, in the example shown in FIG. 3, if the scan area is set to be "http://server1/share1/etc" and "http://server1/share1/doc", processing carried out on "http://server1/share1/etc/" is assigned to one distributed process execution means 21. Processing carried out on "http://server1/share1/doc/" is assigned to another distributed process execution means 21. For example, the distributed process execution means 21 assigned with the processing on "http://server1/share1/etc/" carries out the process in S503 on directories and files such as "http://server1/share1/etc/file1.doc" and "http://server1/share1/etc/file2.xml" which are located immediately below "http://server1/share1/etc/".

According to the above-described process, if the URL corresponds to a file, the URL is added to the list of added, updated, or deleted files as a deleted file. Furthermore, if the URL corresponds to a directory, all the files under the URL in the list of indexed files are added to the list of added, updated, or deleted files.

DESCRIPTION OF SYMBOLS

1 File list creation server
2 Distributed processing server group
3 File server
4 Network
11 Scheduler
12 File scan process division policy determination means
13 File scan execution means
14 File list comparison means
15 Storage device connected to file list creation server 1
16 List of indexed files
21 Distributed process execution means
31 Storage device connected to file server 3
32 Search target file
160 File record in list of indexed files 16
161 Directory URL
162 Information about the files in the directory
163 File name
164 File information hash value

What is claimed is:
1. A file list generation method comprising steps of:
creating a file list of indexed scan target files by a distributed processing server;
storing, in a storage device, the file list of indexed scan target files created by the distributed processing server;
acquiring the file list of indexed scan target files from the storage device, acquiring directory URLs of the scan target files from the file list, analyzing the directory URLs to count a number of directories in each layer, and determining a division unit for division of a scan process to be carried out on scan target directories, based on a result of the counting;
dividing the directories with the scan target files in accordance with a determined division policy, scanning, by the distributed processing server, the scan target files on each of the directories included in the division unit in a distributed manner to create a file list of the scan target files; and comparing the created file list with the file list of indexed scan target files to create a list of files added, changed, or deleted after the scan target files are indexed, and outputting the list.

2. The file list generation method according to claim 1, wherein the step of determining the division unit for the scan process determines a division policy that the number of divisions for the scan process to be carried out on the scan target directories is one when the number of directories counted from a highest layer is less than a predetermined number, and determines a division policy that a first scan is carried out with layers from the directories in the highest layer to a predetermined layer set to be one division unit and that layers located below the scan target directory and discovered during the first scan are scanned with a depth of one layer set to be a division unit when the number of directories is equal to or more than the predetermined number.

3. A file list generation system comprising:
a distributed processing server which creates a file list of indexed scan target files;
a storage device in which the file list of indexed scan target files created by the distributed processing server is stored;
file scan process division policy determination means for acquiring the file list of indexed scan target files from the storage device, acquiring directory URLs of the scan target files from the file list, analyzing the directory URLs to count a number of directories in each layer, and determining a division unit for division of a scan process to be carried out on scan target directories, based on a result of the counting;
file scan means for dividing the directories with the scan target files in accordance with a determined division policy, scanning, by the distributed processing server, the scan target files on each of the directories included in the division unit in a distributed manner to create a file list of the scan target files; and
comparison means for comparing the created file list with the file list of indexed scan target files to create a list of files added, changed, or deleted after the scan target files are indexed, and outputting the list.

4. The file list generation system according to claim 3, wherein the file scan process division policy determination means determines a division policy that the number of divisions for the scan process to be carried out on the scan target directories is one when the number of directories counted from a highest layer is less than a predetermined number, and determines a division policy that a first scan is carried out with layers from the directories in the highest layer to a predetermined layer set to be one division unit and that layers located below the scan target directory and discovered during the first scan are scanned with a depth of one layer set to be a division unit when the number of directories is equal to or more than the predetermined number.

5. A file list generation apparatus comprising:
a file list creation server including a central processing unit, comprising:
file scan process division policy determination means for acquiring a file list of indexed scan target files from a storage device, acquiring directory URLs of the scan target files from the file list, analyzing the directory URLs to count a number of directories in each layer, and determining a division unit for division of a scan process to be carried out on scan target directories, based on a result of the counting;
file scan means for dividing the directories with the scan target files in accordance with a determined division policy, and scanning, by a distributed processing server, the scan target files on each of the directories included in the division unit in a distributed manner to create a file list of the scan target files; and
comparison means for comparing the created file list with the file list of indexed scan target files to create a list of files added, changed, or deleted after the scan target files are indexed, and outputting the list.

6. The file list generation apparatus according to claim 5, wherein the file scan process division policy determination means determines a division policy that the number of divisions for the scan process to be carried out on the scan target directories is one when the number of directories counted from a highest layer is less than a predetermined number, and determines a division policy that a first scan is carried out with layers from the directories in the highest layer to a predetermined layer set to be one division unit and that layers located below the scan target directory and discovered during the first scan are scanned with a depth of one layer set to be a division unit when the number of directories is equal to or more than the predetermined number.

7. A non-transitory computer readable medium storing thereon a file list generation program used for a system comprising a distributed processing server which creates a file list of indexed scan target files, a storage device in which the file list of indexed scan target files created by the distributed processing server is stored, and a file list creation server, the file list generation program causing a computer to execute steps of:
acquiring the file list of indexed scan target files from the storage device, acquiring directory URLs of the scan target files from the file list, analyzing the directory URLs to count a number of directories in each layer, and determining a division unit for division of a scan process to be carried out on scan target directories, based on a result of the counting;
dividing the directories with the scan target files in accordance with a determined division policy; and
comparing a created file list of the scan target files with the file list of indexed scan target files to create a list of files added, changed, or deleted after the scan target files are indexed, and outputting the list,
wherein a distributed processing server scans the scan target files on each of the directories included in the division unit in a distributed manner to create the file list of the scan target files.

8. The file list generation program according to claim 7, wherein the file scan process division policy determination means determines a division policy that the number of divisions for the scan process to be carried out on the scan target directories is one when the number of directories counted from a highest layer is less than a predetermined number, and determines a division policy that a first scan is carried out with layers from the directories in the highest layer to a predetermined layer set to be one division unit and that layers located below the scan target directory and discovered during the first scan are scanned with a depth of one layer set to be a division unit when the number of directories is equal to or more than the predetermined number.

* * * * *